March 1, 1960
G. A. LYON
2,926,956
WHEEL COVER
Filed July 22, 1955
2 Sheets-Sheet 1
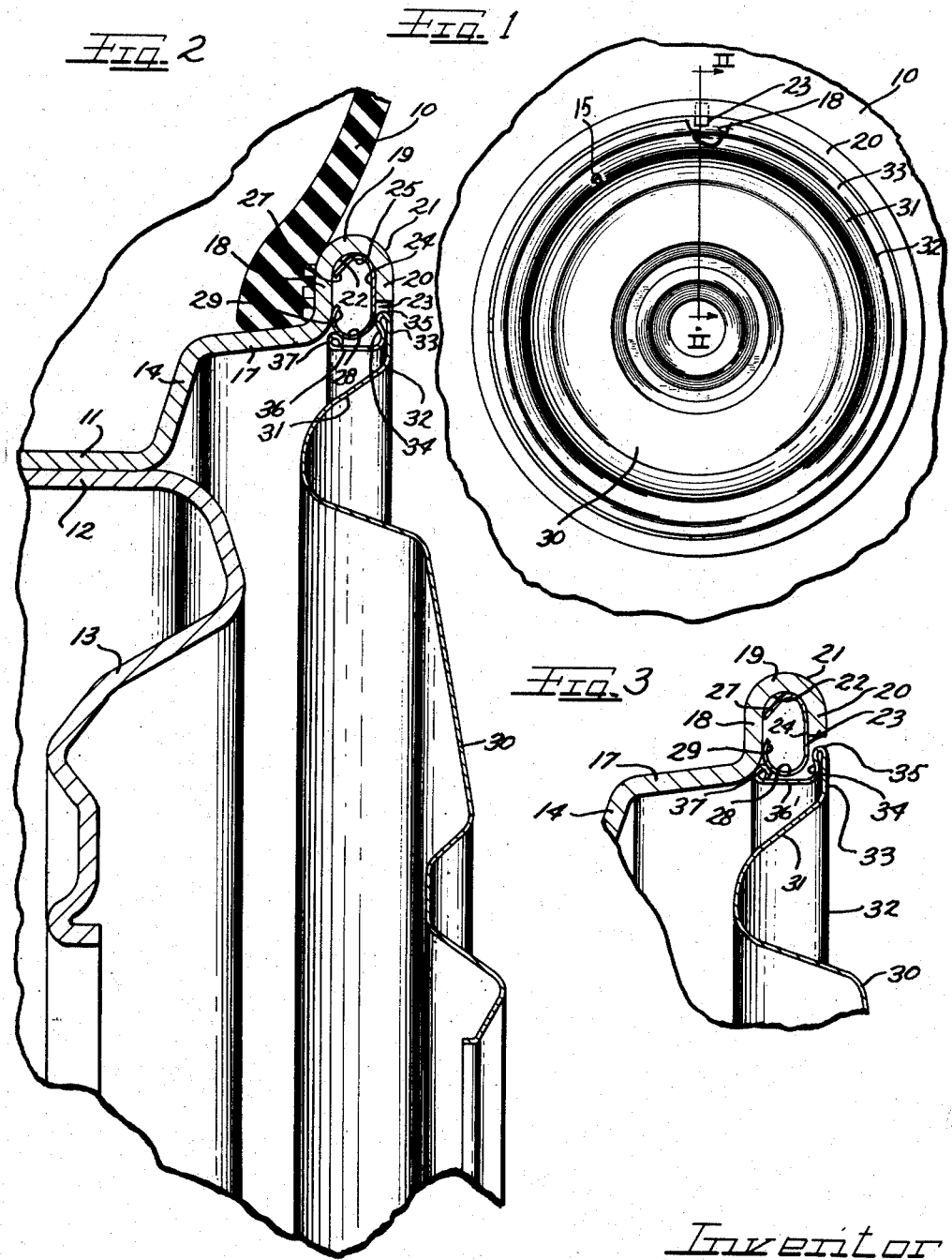
Inventor
GEORGE ALBERT LYON
By Hill, Sherman, Meroni, Gross & Simpson
Attys

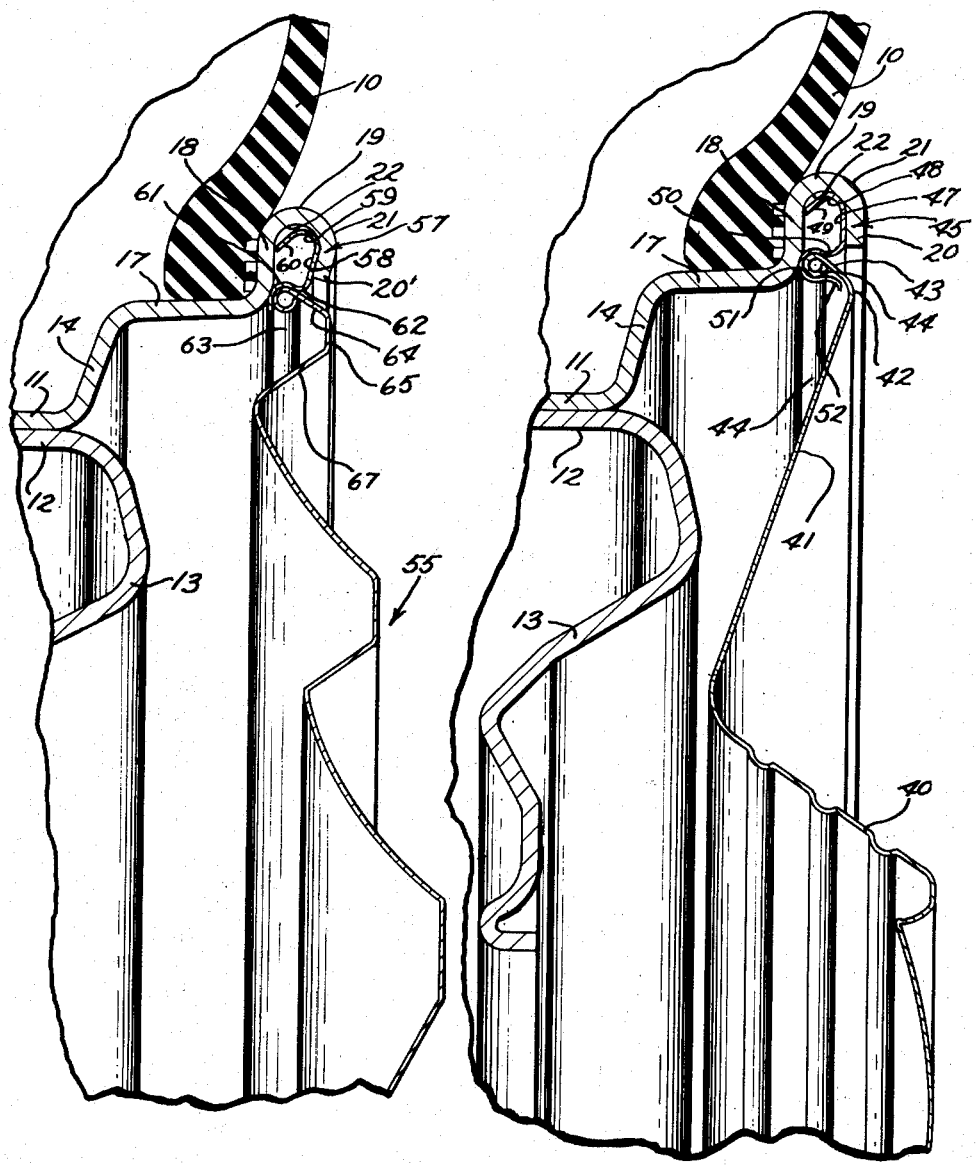

United States Patent Office 2,926,956
Patented Mar. 1, 1960

2,926,956

WHEEL COVER

George Albert Lyon, Detroit, Mich.

Application July 22, 1955, Serial No. 523,747

16 Claims. (Cl. 301—37)

The present invention relates to improvements in wheel structures and more particularly concerns the ornamental and protective covering of the outer sides of vehicle wheels.

With the advent of the tubeless tire, it is desirable to provide means on the terminal flanges of the vehicle wheels to facilitate working thereover of the fairly stiff beads of the tires in mounting or removing the same. I have proposed that this be accomplished by providing the tire rim with a modified terminal flange construction wherein the extremity of the terminal flange is provided with an additional width or extension that is directed to a substantial width radially inwardly for thereby providing a smooth round, substantially abrasion and sharp edge free surface over which the beads of the tires can be worked without undue friction and without danger of abrading or cutting the surface of the bead.

Since this proposed construction provides a substantially U-shaped inwardly opening channel in the terminal flange, I now further propose that such groove or channel be utilized for the reception of cover retaining means by which wheel covers for the outer sides of the wheels are adapted to be retained on the wheel.

It is accordingly an important object of the present invention to provide an improved wheel structure including novel means for retaining wheel covers thereon.

Another object of the invention is to provide an improved wheel structure including a novel cover and cover retaining combination.

A further object of the invention is to provide improved means for retaining wheel covers on vehicle wheels.

It is yet another object of the invention to provide novel cover retaining clip means by which wheel covers are adapted to be held in snap-on, pry-off relation on vehicle wheels.

A still further object of the invention is to provide improved wheel cover means for disposition at the outer side of vehicle wheels.

Other objects, features and advantages of the present invention will be readily apparent from the following detailed description of certain preferred embodiments thereof taken in conjunction with the accompanying drawings, in which:

Figure 1 is an outer side elevational view of a vehicle wheel structure embodying features of the invention, with certain part broken away to show detail of structure;

Figure 2 is an enlarged fragmentary radial sectional view taken substantially on the line II—II of Fig. 1;

Figure 3 is a fragmentary radial sectional view substantially like Fig. 2 but showing a slight modification;

Figure 4 is a radial sectional view similar to Fig. 2 but showing another modification; and Figure 5 is a radial sectional view similar to Fig. 2 but showing still another modification.

The present invention is especially concerned with a vehicle wheel such as an automobile wheel of the kind that is particularly suitable for supporting a tubeless tire 10, although it may be used with a tire and tube combination if desired. The tire 10 is supported by a multi-flange, drop-center tire rim which includes an inner base flange 11 that is secured in suitable manner to an attachment flange 12 of a disk spider wheel body 13. From the outer side of the base flange 11 extends a side flange 14 that is adapted to support a suitable valve stem 15. At the radially outer side of the side flange 14 it merges with an intermediate generally axially outwardly and radially outwardly sloping flange 17 that leads into a terminal flange 18 directed generally radially outwardly therefrom and then turned generally axially outwardly as shown at 19.

At its outer extremity the terminal flange is provided with a generally radially inwardly extending annular flange lip extension 20 of substantial width affording at the juncture of the flange extension 20 with the preferably arcuately curved, both circumferentially and transversely, axially extending portion 19 a rounded smooth shoulder 21. Within the terminal flange is thus provided a generally radially inwardly opening annular channel or groove 22 providing a substantial chamber or socket.

According to the present invention the groove chamber or socket 22 is utilized for the reception therein of cover retaining means preferably in the form of retaining spring clips 23 of which there may be as many as preferred, but are shown as four in number in Fig. 1. Each of the clips 23 is preferably formed from suitable resilient sheet metal stock such as spring steel, or the like, and is constructed and arranged to be self-retaining within the socket 22. To this end, the spring clip 23 includes a body 24 of substantial width and of a length that is preferably longer than the terminal extension flange 20 but not in excess of the width of the inner radially extending portion 18 of the terminal flange structure.

At one end portion thereof the body 24 of the clip is provided with a retaining head comprising a shoulder 25 arranged to bottom or seat within the groove socket 22 and preferably curved or contoured complementary thereto, at least in a longitudinal cross-sectional sense. Spaced from the body 24 and turned divergently relative thereto is a retaining terminal flange 27 at the extremity of the head 25. The tip of the retaining terminal 27 normally projects to a greater width or distance from the body 24 than the space between the terminal flange portions 18 and 20. Hence, upon pressing the retaining clip 23 longitudinally into the groove socket 22, the resilient retaining terminal 27 is placed under compression and thus is resiliently tensioned and the tip thereof thrusts bitingly against the terminal flange portion 18 and is thus maintained by the backed-up relation of the body 24 against the terminal flange extension 20.

Since the terminal retaining flange 27 of the clip is angled radially and axially inwardly, any tendency for the clip to dislodge radially inwardly from the socket groove 22 is highly resisted by the biting retaining terminal 27.

At its opposite end portion, the retaining clip 23 is provided with a resilient cover retaining shoulder portion 28 that is exposed radially inwardly from the terminal flange extremity portion 20 and in this instance comprises a radially inwardly convex portion having an underturned smooth resilient thrusting shoulder extremity 29 which in assembly bottoms slidably against the terminal flange portion 18 adjacent to juncture thereof with the intermediate flange 17. Through this arrangement the bottoming, thrusting extremity shoulder portion 29 assists in maintaining the clip in assembly with the tire rim flange since normally the thrusting shoulder portion 29 extends to a greater width or spacing relative to the body 24 than the spacing between the terminal flange portions 18 and 20. However, the thrust shoulder extremity portion 29 is radially slidable on the terminal flange portion 18 in response to radially outward thrust against the cover retaining shoulder 28 and resilient radially outward deflection thereof, which develops a resilient tension tending at all times to return the shoulder 28 radially inwardly to its normal position.

By the provision of the retaining clips 23 a wheel cover 30 is adapted to be retained in snap-on, pry-off relation on the outer side of the wheel. In the present instance the cover 30 is shown as comprising a sheet metal disk that substantially covers the wheel body 13 and the tire rim and is of the full disk type, although the cover may, if preferred, comprise a trim ring arrangement, that is an annulus that covers only the tire rim or the tire rim and an adjacent portion of the wheel body. In any event, the cover 30 may be made from suitable sheet material such as stainless steel, brass, aluminum alloy, or the like adapted to be made by suitable manufacturing techniques such as stamping or drawing, and then appropriate finish such as polishing and plating.

In its radially outer portion, the wheel cover 30 has an annular generally radially and axially outwardly projecting area 31 that is arranged to overlie the outer side of the tire rim and more particularly the side flange 14 thereof. This joins on a juncture rib-like annular reinforcing ridge 32 with a radially outer annular portion 33 of a diameter slightly less than the diameter at the tip of the terminal flange extremity 20. Behind the marginal cover portion 33 is an underturned annular flange 34 providing at its juncture a reinforcing and finishing bead 35 and in the present instance adapted to seat in assembly against the radially inwardly extending exposed portion of the clip body 24.

For snap-on, pry-off cover retaining interengagement with the cover retaining resilient shoulder structure 28 of the clips, the underturned flange 34 is provided with a cover retaining flange extension 36 directed substantially axially inwardly on a diameter that is adapted to accommodate the clip shoulders radially outwardly thereof when a terminal extremity retaining shoulder structure 37, herein in the form of an outturned continuous annular bead 37 engages with the radially and axially inwardly facing portion of the resilient retaining shoulder 28. Herein, the spacing between the axially inner extremity of the retaining bead 27 and the clip engaging shoulder portion of the underturned flange 34 is such that when the flange 34 is seated against the clips, the bead 37 will be supported in spaced relation to the tire rim. Thereby the cover is entirely supported by the retaining clips in resilient, cushioned relation both against radial and axial deflectional forces.

In applying the cover 30 to the outer side of the wheel, the retaining bead 37 is seated against the axially outer side of the shoulder 28 of the retaining clips and axially inward pressure applied to the outer side of the cover to press the bead 37 against the radially inwardly projecting underlying portions of the retaining clips to effect resilient compression and radially outward deflection of the retaining clip shoulder until the beads 37 snap behind the clip shoulders. At the same time, of course, the underturned flange portion 35 comes to rest or bottoms or seats against the retaining clips which thus support the cover in predetermined axial disposition relative to the wheel, wherein the outer marginal portion 33 of the cover is preferably supported approximately in the plane of the turned terminal flange extremity portion 20 so as to be protected by the terminal flange against curbing or other objects toward which the wheel may be driven.

Since the retaining clip shoulders 28 are placed under substantial resilient tension as a result of engagement thereof by the retaining means on the shoulder, a firm retaining gripping interengagement of the retaining clip shoulders and the retaining bead 37 of the cover is maintained.

Removal of the cover from the wheel may be effected by inserting a pry-off tool such as a screw driver between the outer bead 35 and the tip of the terminal flange extremity portion 20 and then by the application of pry-off force the retaining bead 37 of the cover can be snapped free from the retaining clip shoulders 28.

In Fig. 3 a slightly modified arrangement is shown wherein the wheel and the retaining clips are preferably substantially the same as in the form of Fig. 2 and are therefore identified in all particulars by the same reference numerals. In addition, the cover is preferably substantially the same as the cover 30 and is thus identified by similar reference numerals, except that a retaining flange 36' as an axially inward extension from the underturned flange 34 is provided that is somewhat longer than the similar cover flange 36 in Fig. 2. Accordingly, when the cover of Fig. 3 is applied to the outer side of the wheel, and the retaining terminal bead 37 is snapped behind the clip retaining shoulders 28, the retaining bead 37 will engage against the tire rim and more particularly adjacent juncture of the intermediate flange 17 with the terminal flange portion 18 to thereby determine the axial disposition of the cover, while the underturned cover flange 34 will be maintained in spaced relation to the clips.

Having reference to the form of the invention shown in Fig. 4, a cover 40 is adapted to be applied to the outer side of a vehicle wheel which in all essential respects may be the same as the wheel shown in Fig. 2 and is therefore similarly identified as to the several parts. In this form the wheel cover 40 has a generally radially and axially outwardly extending annular portion 41 that joins on an annular reinforcing rib-like ridge 42 an outer annular marginal cover portion 43 which in the present instance is directed generally radially outwardly and axially inwardly and terminates in an underturned reinforcing and cover retaining annular bead 44 adapted to interengage with retaining spring clips 45 which may be of suitable number and constructed and arranged to engage retainingly within the annular groove socket 22 of the tire rim.

Each of the retaining clips 45 includes an elongated body 47 of substantial width adapted to engage against the inner side of the terminal flange extremity portion 20 and has at its radially outer end a turned shoulder 48 that engages within the base of the groove 22 and terminates in a generally radially and axially inwardly directed clip retaining biting edge or end terminal 49 that engages bitingly under resilient tensioned thrust against the opposing surface of the terminal flange portion 18, similarly as the terminal 27 of the clips 23.

At its radially inner end portion the clip body 47 is provided with cover retaining means that extends radially inwardly beyond the edge of the terminal flange portion 20. Herein such retaining means comprises a socket arrangement for receiving and resiliently retaining and supporting the cover bead 44. To this end, a generally axially inwardly directed flange portion 50 is provided as an extension from the clip body 47 and has a turned generally radially inwardly and axially outwardly directed and axially outwardly opening socket portion 51 receptive of the cover bead 44 and terminating in a generally axially outwardly extending and radially inwardly turned resilient retaining terminal flange 52. Both the socket flange extension 50 and the retaining resilient terminal flange 52 are preferably provided with overhanging respective shoulders that engage about the bead at the axially outer side thereof, so that the bead retaining socket 51 actually engages the bead over more than 180° of its surface axially outwardly beyond a radial plane through the center of the bead. Through this arrangement, application of the cover 40 to the outer side of the wheel is adapted to be effected by aligning the bead 44 thereof with the axially outwardly opening cover retaining sockets 51 of the retaining clips and then pressing axially inwardly to snap the bead into the sockets to be gripped between the socket wall flange 50 and the resilient flange 52. In this instance the retaining socket 51 of the clip engages resiliently against the tire rim to back up and resiliently push the clip body 47 into firm engagement with the terminal flange portion 20.

In order to remove the cover 40 from the wheel, a pry-off tool such as a screw driver is adapted to be applied behind the bead 44 and pry-off leverage applied by fulcruming the pry-off tool against the terminal flange portion 20 for snapping the bead 44 out of the retaining socket 51 of the clips.

In the form of the invention shown in Fig. 5, a wheel cover 55 is adapted to be applied to the outer side of a vehicle wheel structure that is in all essential respects the same as that shown in Fig. 2 and accordingly similar reference numerals identify similar parts thereof except that the terminal flange extremity is, as shown at 20' turned generally radially and axially inwardly obliquely so that the mouth of the socket groove 22 is slightly narrower than the maximum width of the groove adjacent the bottom thereof.

Within the narrow-mouth groove 22 in Fig. 5, is supported a series of retaining spring clips 57, of suitable number, circumferentially spaced, adapted for retaining the cover 55 in snap-on, pry-off relation on the wheel. To this end, each of the clips 57 includes a longitudinal body 58 of substantial width having a head end portion 59 that is generally complementary to and seats within the groove 22 and terminates in a generally radially and axially inwardly oblique resilient retaining terminal flange 60 that engages at its tip in biting retaining relation with the opposing surface of the terminal flange portion 18. The clip body, of course, engages against the inner surface of the terminal flange extension 20' and at its radially inner end portion projects beyond the tip of the flange extremity.

For retaining the cover 55 on the wheel, the clips 58 are each provided with a radially inner end cover-retaining socket portion 61 which comprises a terminal flange on the body 58 that extends generally axially inwardly and then is turned radially inwardly and is adapted to seat under resilient tension against the tire rim adjacent juncture of the intermediate flange 17 with the terminal flange portion 18. It will be observed that the axially extending portion of the socket terminal flange 61 of the clip has an overhanging shoulder 62 that is retainingly engageable over a terminal annular bead 63 of the cover extremity at the edge of a generally radially outwardly and axially inwardly directed marginal portion 64 of the cover. Such marginal portion is joined by a rib-like ridge 65 annularly about a generally radially and axially outwardly directed cover portion 67 on the cover plate 55.

In applying the cover 55 to the outer side of the wheel, it is generally centered with respect to the wheel and then the terminal bead 63 of the cover is pressed axially inwardly to snap behind the slightly smaller diameter shoulder 62 of the retaining clips into nested engagement within the socket flange 61 of the clips which not only retains the bead 63 but thereby supports the cover. At the same time, of course, the retaining socket flange 61 of the clips is placed under radially outward thrusting resilient compression by the cover bead 63 which is resisted by the clip body 58 which thus establishes a resiliently tensioned engagement of the cover by the clips. For removing the cover 55 from the wheel, a pry-off tool such as a screw driver or the like may be applied behind the terminal bead 63 of the cover and then fulcrumed against the tip of the tire rim terminal flange 20' to pry the cover free from the retaining clips.

It will be appreciated, of course, that each of the covers 40 and 45 may be made from similar material and according to similar process as described for the cover 30.

In each of the wheel structures described, after the respective covers are mounted on the wheel, the retaining outer marginal portions of the covers engage interlockingly with the respective retaining clips to thereby positively hold the clips within the socket of the tire rim terminal flange against any possibility of working out of such socket in service. However, even after the cover is removed, the clips will be effectively retained within the terminal flange sockets by the expanded resilient biting tip retaining terminal flanges at the retaining head end portions of the clips and the clips may be removed only by deliberately prying the terminal retaining flanges thereof free from the terminal flange of the tire rim by means of a suitable tool.

It will be understood that modifications and variations may be effected without departing from the scope of the novel concepts of the present invention.

I claim as my invention:

1. In a wheel structure including a tire rim having a generally radially inwardly opening groove therein, a retaining clip retainingly engaging in said groove, the clip having a radially inner resilient cover retaining flange portion, and a cover for disposition at the outer side of the wheel having an outer marginal portion including a terminal extremity retainingly engageable with the retaining clip retaining flange portion in snap-on, pry-off relation, said terminal extremity including a pair of shoulders gripping the retaining flange portion of the retaining clip therebetween.

2. In a wheel structure including a tire rim having a generally radially inwardly opening groove therein, a retaining clip retainingly engaging in said groove, the clip having a radially inner resilient cover retaining flange portion, and a cover for disposition at the outer side of the wheel having an outer marginal portion including a terminal extremity retainingly engageable with the retaining clip retaining flange portion in snap-on, pry-off relation, said terminal extremity of the cover being engageable with and shouldering against the tire rim behind the resilient retaining flange of the clip.

3. In a wheel structure including a tire rim having a terminal flange carrying a series of resilient radially inwardly projecting cover retaining clips, a cover for disposition at the outer side of the wheel including an annular generally radially and axially outwardly extending portion joining a terminal portion of the cover on a reinforcing rib and said terminal portion having a turned integral extremity comprising an extension in one piece therewith resiliently retainingly directly engageable with the retaining clips.

4. In a wheel structure including a generally radially opening annular groove having axially inner and outer wall portions and a base portion connecting said walls in a generally U-shaped structure, a cover retaining clip for engagement within said groove including axially spaced resiliently spreadable portions retainingly engageably thrusting against the opposing surfaces of said wall portions inside said groove and joined by a head portion opposing said base portion of the groove, with a cover retaining opposite end portion of the clip projecting from the groove.

5. In a wheel structure including a generally radially opening annular groove having axially inner and outer wall portions and a base portion connecting said walls, a cover retaining clip for engagement within said groove including resiliently spreadable portions retainingly engageably thrusting against said wall portions and joined by a head portion opposing said base portion of the groove, with a cover retaining opposite end portion on the clip, said opposite end portion of the clip comprising a turned under resilient cover retaining shoulder flange, said turned under shoulder flange bottoming resiliently against the tire rim and thereby applying thrust against the remainder of the clip to assist in holding the clip in said groove.

6. In a wheel structure including a tire rim having a terminal flange provided with a flange extremity extension to define within the terminal flange a generally U-shaped annular radially inwardly opening socket groove, a plurality of cover retaining clips mounted within said groove including fingers extending generally radially inwardly and axially for biting wedging engagement with a wall of the groove, and said clips having portions thereof extending from the groove for retaining engagement with a cover to hold the cover on the wheel.

7. In a wheel structure including a tire rim having a terminal flange provided with a flange extremity extension to define within the terminal flange a generally U-shaped annular radially inwardly opening socket groove, a plurality of cover retaining clips mounted within said groove and having portions thereof providing extensions extending therefrom for retaining engagement with a cover to hold the cover on the wheel, said cover retaining extensions including a turned under resilient flange thrusting resiliently against the tire rim.

8. In a wheel structure including a tire rim having a terminal flange provided with a flange extremity extension to define within the terminal flange a generally U-shaped annular radially inwardly opening socket groove, a plurality of cover retaining clips mounted within said groove and having portions thereof providing extensions extending therefrom for retaining engagement with a cover to hold the cover on the wheel, said cover retaining extensions including a generally radially inwardly opening socket for engagement with a bead on the cover.

9. In a wheel structure including a tire rim having a substantially U-shaped terminal flange with a generally radially inwardly opening socket groove therein defined by a lip terminal portion projecting substantially radially inwardly, retaining clips having radially outer terminal portions thereof housed and engaged within said socket groove and having portions thereof projecting radially inwardly out of said groove beyond said lip terminal and turned for providing cover retaining shoulders adjacent to the edge of said lip terminal, and a cover for disposition at the outer side of the wheel having means thereon adjacent to the mouth of the groove and retainingly interengageable with said shoulders of the clips.

10. In a wheel structure including a tire rim having a substantially U-shaped terminal flange with a generally radially inwardly opening socket groove therein defined by a lip terminal portion projecting substantially radially inwardly, retaining clips having radially outer terminal portions thereof housed and engaged within said socket groove and having portions thereof projecting radially inwardly out of said groove beyond said lip terminal and turned for providing cover retaining shoulders adjacent to the edge of said lip terminal, and a cover for disposition at the outer side of the wheel having means thereon adjacent to the mouth of the groove and retainingly interengageable with said shoulders of the clips, said clip shoulders supporting the cover out of engagement with the wheel.

11. In a wheel structure including a tire rim having a substantially U-shaped terminal flange with a generally radially inwardly opening socket groove therein defined by a lip terminal portion projecting substantially radially inwardly, retaining clips having radially outer terminal portions thereof housed and engaged within said socket groove and having portions thereof projecting radially inwardly out of said groove beyond said lip terminal and turned for providing cover retaining shoulders adjacent to the edge of said lip terminal, and a cover for disposition at the outer side of the wheel having means thereon adjacent to the mouth of the groove and retainingly interengageable with said shoulders of the clips, said retaining clip shoulders including resilient flanges bottomed against the tire rim.

12. In a wheel structure including a tire rim having a substantially U-shaped terminal flange with a generally radially inwardly opening socket groove therein defined by a lip terminal portion projecting substantially radially inwardly, retaining clips having radially outer terminal portions thereof housed and engaged within said socket groove and having portions thereof projecting radially inwardly out of said groove beyond said lip terminal and turned for providing cover retaining shoulders adjacent to the edge of said lip terminal, and a cover for disposition at the outer side of the wheel having means thereon adjacent to the mouth of the groove and retainingly interengageable with said shoulders of the clips, said retaining means on the cover including a turned substantially stiff terminal bead engageable with the retaining clip shoulders.

13. In a wheel structure including a tire rim having a terminal flange with an extremity extension directed generally radially inwardly into overlying relation to the tire rim, said extension being disposed generally obliquely axially inwardly toward its tip and defining with the remainder of the terminal flange a groove that has an opening that is narrower at the tip of said extension than the remainder of the groove, and cover retaining clips having radially outer portions thereof supported and retained within said remainder of the groove and radially inner portions projecting from said opening for retaining engagement with a portion of a cover.

14. In a wheel structure including a tire rim having on the outer side thereof a terminal flange including a generally radially extending portion joining an intermediate flange and having at the radially outer margin thereof a generally axially outwardly turned portion, cover retaining clips carried by the terminal flange and having resilient radially deflectable retaining shoulder portions facing generally radially inwardly and including adjacent additional generally axially inwardly facing shoulder means slidably bottoming on said radially extending terminal flange portion adjacent to juncture thereof with the intermediate flange, and a cover for disposition over the outer side of the wheel including an outer marginal cover retaining terminal structure engageable in press-on, pry-off relation with said radially facing shoulder portions, said axially inwardly facing shoulder means on the clips retaining the shoulder portions of the clips in predetermined axially inward disposition during the press-on of the cover.

15. In a wheel structure including a tire rim having on the outer side thereof a terminal flange including a generally radially extending portion joining an intermediate flange and having at the radially outer margin thereof a generally axially outwardly turned portion, cover retaining clips carried by the terminal flange and having resilient radially deflectable retaining shoulder portions facing generally radially inwardly and including adjacent additional generally axially inwardly facing shoulder means slidably bottoming on said radially extending terminal flange portion adjacent to juncture thereof with the intermediate flange, and a cover for disposition over the outer side of the wheel including an outer marginal cover retaining terminal structure engageable in press-on, pry-off relation with said radially facing shoulder portions, said axially inwardly facing shoulder means on the clips retaining the shoulder portions of the clips in predetermined axially inward disposition during the press-on of the cover, said axially outwardly turned terminal flange portion including a generally radially inwardly extending terminal lip portion overlying the first mentioned radially extending terminal flange portion and coacting with the retaining clips to retain the same against axially outward displacement during pry-off of the cover.

16. In a wheel structure including an annular portion providing a socket groove of substantial depth with an annular mouth opening generally radially therefrom, a resilient sheet metal cover-retaining clip selectively mounted within the circumference defined by said socket groove and substantially enclosed therein, said clip having on the portion thereof within the socket groove retaining means grippingly interengaging with the walls of the socket groove and thereby held therein, the clip having as the only exposed portion thereof cover retaining means projecting a limited distance from the mouth of the socket groove for resilient press-on, pry-off retaining engagement with retaining means on a cover.

References Cited in the file of this patent

UNITED STATES PATENTS

| | | |
|---|---|---|
| 2,049,566 | Knapp | Aug. 4, 1936 |
| 2,123,025 | Ramirez | July 5, 1938 |
| 2,148,995 | Nelson | Feb. 28, 1939 |
| 2,351,655 | Aske | June 20, 1944 |
| 2,410,174 | Lyon | Oct. 29, 1946 |
| 2,440,858 | Hollerith | May 4, 1948 |
| 2,749,184 | Wood | June 5, 1956 |